US006573450B2

(12) United States Patent
Saito et al.

(10) Patent No.: US 6,573,450 B2
(45) Date of Patent: Jun. 3, 2003

(54) WATERPROOF STRUCTURE FOR TERMINAL PORTION OF ELECTRIC WIRE PROVIDED ON HOUSING BODY FOR ELECTRIC COMPONENTS

(75) Inventors: Satoshi Saito, Shizuoka (JP); Daiji Hotta, Shizuoka (JP); Yoshihide Tsukamoto, Aichi (JP); Hiroaki Matsui, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/046,913

(22) Filed: Jan. 17, 2002

(65) Prior Publication Data

US 2002/0117319 A1 Aug. 29, 2002

(30) Foreign Application Priority Data

Jan. 17, 2001 (JP) ....................................... 2001-008588

(51) Int. Cl.[7] ................................................. H02G 3/18

(52) U.S. Cl. ........................ 174/65 G; 174/65; 174/55; 174/135; 174/65 R; 174/152 G; 16/2.1; 16/2.2; 248/56; 439/567

(58) Field of Search ............................ 174/65 G, 65.33, 174/135, 152 G, 153 G, 151, 65 R; 248/56; 16/2.1, 2.2; 439/462, 567

(56) References Cited

U.S. PATENT DOCUMENTS 5,410,104 A * 4/1995 Gratz et al. ............... 248/56 X
5,806,139 A * 9/1998 Anderson et al.
5,960,277 A * 9/1999 Tallmadge et al.
6,180,883 B1 * 1/2001 Copeland .................. 174/65 G
6,363,186 B1 * 3/2002 Dasms et al. ........... 174/136 X
6,376,777 B1 * 4/2002 Ito et al. ................... 174/65 G
6,479,748 B2 * 11/2002 Mori ........................ 174/65 G
6,489,659 B2 * 12/2002 Nakata et al. ............ 174/65 G

* cited by examiner

*Primary Examiner*—Dean A. Reichard
*Assistant Examiner*—Dhiru R. Patel
(74) *Attorney, Agent, or Firm*—Sughrue Mion, PLLC

(57) ABSTRACT

An electric wire is inserted through a through hole formed with a housing body. A first terminal fitting is provided with a first clamper which clamps a portion of the electric wire situated inside of the housing body to electrically connect therewith. A second terminal fitting is provided with a second clamper which clamps a portion of the electric wire situated outside of the housing body. A grommet made of an elastic material has a cylindrical shape such that the electric wire is passed through an inner periphery thereof and an outer periphery thereof is fitted into the through hole of the housing body. A reinforcing spacer is provided on a part of the outer periphery of the grommet so as to abut against at least one of a first edge of the through hole at an outer face of the housing body and a second edge of the through hole at an inner face of the housing body. The reinforcing spacer is made of a material having greater hardness than the elastic material forming the grommet.

5 Claims, 4 Drawing Sheets

WATERPROOF STRUCTURE FOR TERMINAL PORTION OF ELECTRIC WIRE PROVIDED ON HOUSING BODY FOR ELECTRIC COMPONENTS

BACKGROUND OF THE INVENTION

The present invention particularly relates to a waterproof structure for a terminal portion of an electric wire, a cable or a wire harness provided on a housing body for electric components such as a motor case for an electric vehicle.

FIG. 4 is a sectional view showing a related waterproof structure at a through hole 2 formed with a housing body 1 for an electric apparatus such as a motor mounted on an electric vehicle, through which a terminal portion of an electric wire 4 (in this case, a shield electric wire) is inserted. The electric wire 4 is inserted through a grommet 3 formed of an elastic material such as rubber which is fitted in the through hole 2 in a watertight manner. Inside of the housing 1, an insulation sheath of the terminal portion of the electric wire 4 is peeled and an exposed conductor 4*a* is connected to an LA terminal (a circular plate terminal) 5 through caulking. The LA terminal 5 is fastened in a screw hole 5*a* with a fastening member such as a bolt. Moreover, the electric wire 4 in the outside portion of the housing 1 which does not pass through the through hole 2 is held in and fixed to a flag terminal 6 having a bracket shape. The flag terminal 6 is fastened in a screw hole 6*a* with a fastening member such as a bolt. Thus, the electric wire 4 is fixed to the LA terminal 5 and the flag terminal 6 in two portions of the inside and outside of the housing 1 and is straight inserted so as not to be inclined with respect to the through hole 2.

In the related electric wire terminal portion waterproof structure shown in FIG. 4, if a worker fastens the LA terminal 5 and the flag terminal 6, particularly, fastens the flag terminal 6 excessively in a direction pulling to the worker, uneven force acts on the grommet 3. As a result, the grommet 3 formed of rubber is distorted and deformed elastically so that the close contact in the through hole 2 is lost. Consequently, there is a risk that rainwater or car-washing water enters the housing 1, resulting in the damage of a watertightness function.

More specifically, when the LA terminal 5 and the flag terminal 6 are to be screwed into the screw holes 5*a* and 6*a* on the inside and outside of the through hole 2, an axis C of the screw hole 5*a* of the LA terminal 5 should be straight with respect to the through hole 2 by the discretion of the worker but it is actually inclined obliquely by an angle $\theta 1$ to be an axis $C_1$. An offset load acts around the vicinity of the grommet 3 by tensile force generated with such an inclination so that one of the sides of the grommet 3 indicated as 3*a* in the drawing is twisted or crushed and a clearance 7 is thereby formed between the other side indicated as 3*b* and the through hole 2.

SUMMARY OF THE INVENTION

Accordingly, it is an object of the invention to provide a waterproof structure for a terminal portion of an electric wire, which is able to surely maintain the watertightness of a through hole formed with a housing body for a motor mounted on an electric vehicle.

In order to achieve the above object, according to the present invention, there is provided a waterproof structure, comprising:

a housing body, formed with a through hole;

an electric wire, inserted through the through hole;

a first terminal fitting, provided with a first clamper which clamps a portion of the electric wire situated inside of the housing body to electrically connect therewith;

a second terminal fitting, provided with a second clamper which clamps a portion of the electric wire situated outside of the housing body;

a grommet, made of an elastic material and having a cylindrical shape such that the electric wire is passed through an inner periphery thereof and an outer periphery thereof is fitted into the through hole of the housing body; and a reinforcing spacer, provided on a part of the outer periphery of the grommet so as to abut against at least one of a first edge of the through hole at an outer face of the housing body and a second edge of the through hole at an inner face of the housing body, the reinforcing spacer made of a material having greater hardness than the elastic material forming the grommet.

When the first terminal fitting and the second terminal fitting are to be screwed on the inside and outside of the housing body, both terminal fittings are fastened in such a direction that they are forcibly pulled by the discretion of a worker. In such a situation, the grommet receives an offset load in the through hole so that the grommet in a portion abutting against the edge of the through hole particularly tends to be distorted and deformed elastically. According to the above configuration, since the reinforcing spacer is provided at such a portion, the offset load can be received by the reinforcing spacer to suppress the distortion and the elastic deformation, thereby preventing a clearance from being formed together with the through hole and maintaining watertightness.

Preferably, the reinforcing spacer abuts against at least the first edge.

In this configuration, since the second terminal fitting on the outside of the housing body is easily pulled by the fastening work of the worker the elastic deformation can be prevented effectively.

Preferably, the reinforcing spacer is integrally molded with, the grommet.

In this configuration, it is possible to reduce manufacturing time and cost.

Preferably, the reinforcing spacer includes a first part having a first diameter which is substantially identical with a diameter of the through hole of the housing body and a second part having a second diameter which is larger than the first diameter. Here, the first part is fitted into the through hole and the second part abuts against either the inner face or the outer face of the housing body.

In this configuration, since the second portion abuts against the edge of the through hole to intrude thereinto, a slip is thereby eliminated to increase a degree of close contact so that the reinforcing and sealing effects can be further enhanced.

Preferably, the grommet extends so as to cover both of a part of the first clamper and a part of the second clamper.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
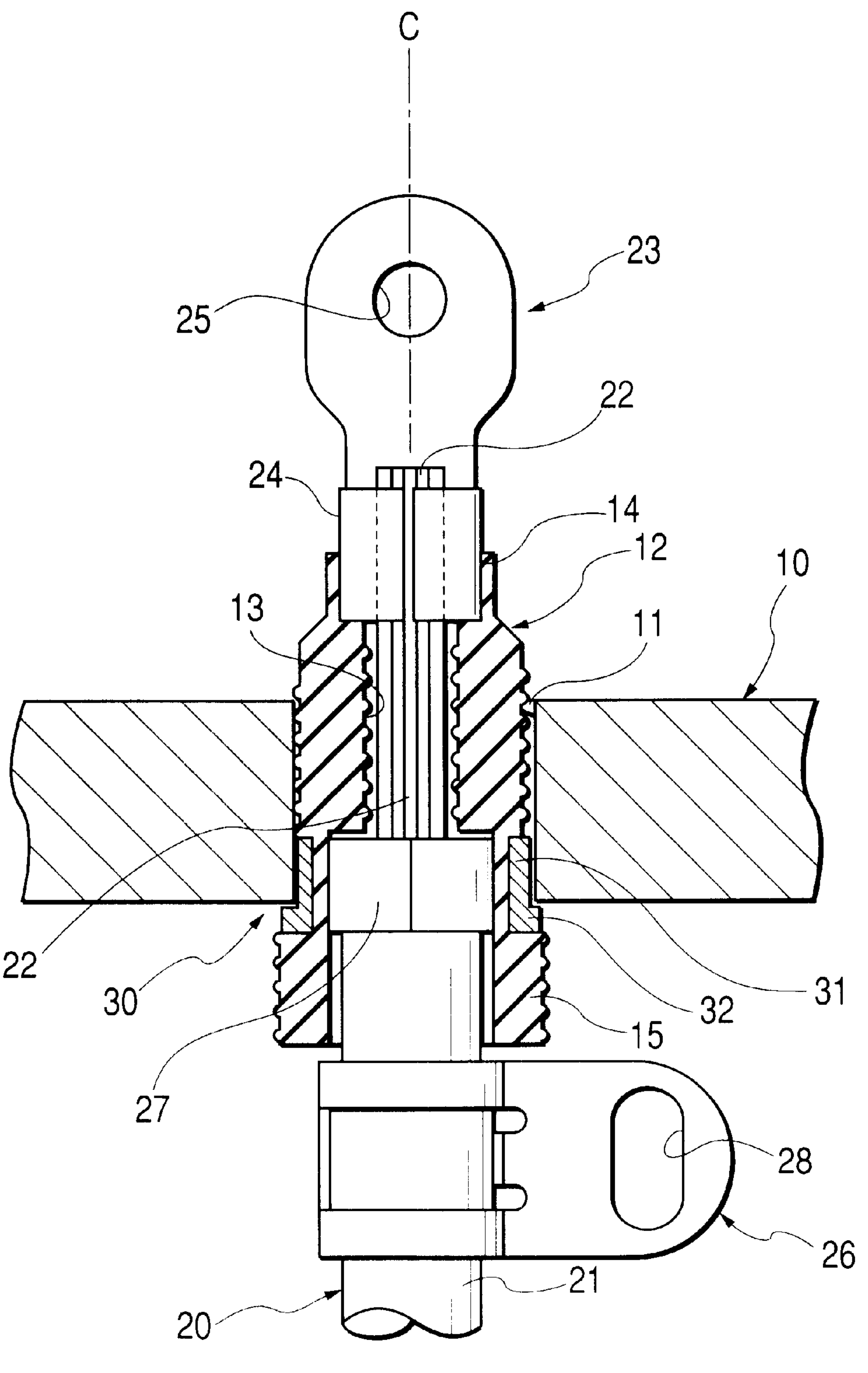
FIG. 1 is a partial section view of a waterproof structure according to one embodiment of the invention.

One embodiment of a waterproof structure for a terminal portion of an electric wire provided on a housing body for electric components according to the invention will be described below in detail with reference to the accompanying drawings.

A housing 10 such as a motor case is provided with a through hole 11 through which a terminal portion of an electric wire 20 such as a shielding wire is inserted. The terminal portion of the electric wire 20 is inserted in the housing 10 through a grommet 12 formed of an elastic material which is fitted in the through hole 11 in a watertight manner.

Inside of the housing 10, an insulation sheath 21 to be the cover of the terminal portion of the electric wire 20 is peeled to expose a conductor 22, and clamped by a clamper 24 of an LA terminal 23 (a first terminal fitting) so that they are electrically connected. The LA terminal 23 is fastened in a screw hole 25 formed with a leading end portion thereof with a fastening member (not shown) such as a bolt.

Moreover, the electric wire 20 in a portion on the outside of the housing 1 which is not inserted in the through hole 11 is held and fixed through a flag terminal 26 (a second terminal fitting). The flag terminal 26 clamps the electric wire 20 with a clamper 27 formed on a leading end portion thereof so as to cover the sheath 21, and is fastened in a screw hole 28 with a fastening member such as a bolt which is not shown.

The grommet 12 is attached from the outside so as to cover both of the clamper 24 of the LA terminal 23 and the clamper 27 of the flag terminal 26. The grommet 12 is a cylindrical molded product made of an elastic material such as resin or rubber. An outer peripheral surface of the grommet comes in close contact with the through hole 11 and is fitted therein with watertightness. Moreover, the exposed conductor 22 is inserted through a through hole 13 penetrating through the longitudinal axis of the grommet 12, thereby protecting the conductor 22.

Figure 3:
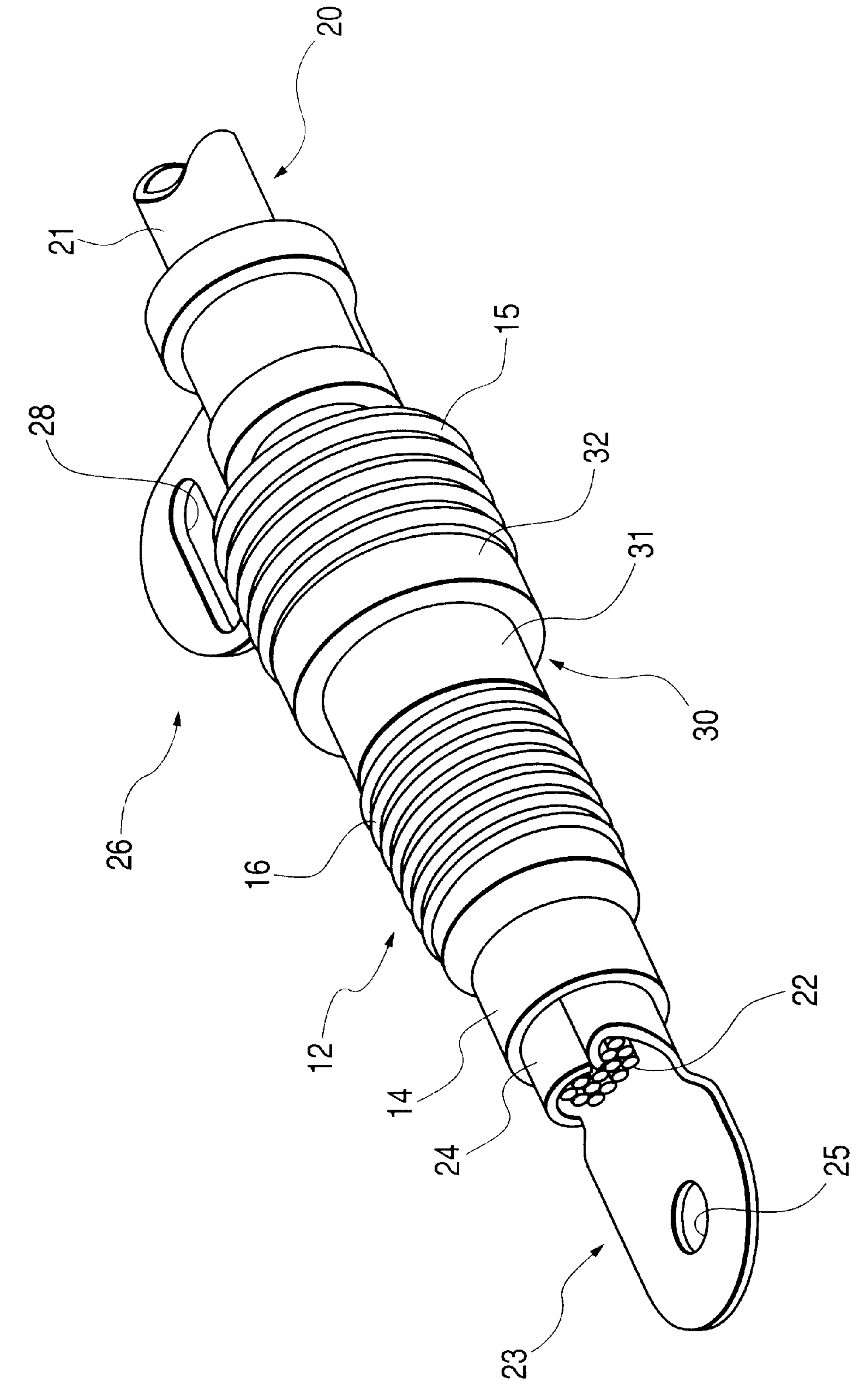
FIG. 3 is a perspective view of the waterproof structure.
Figure 4:
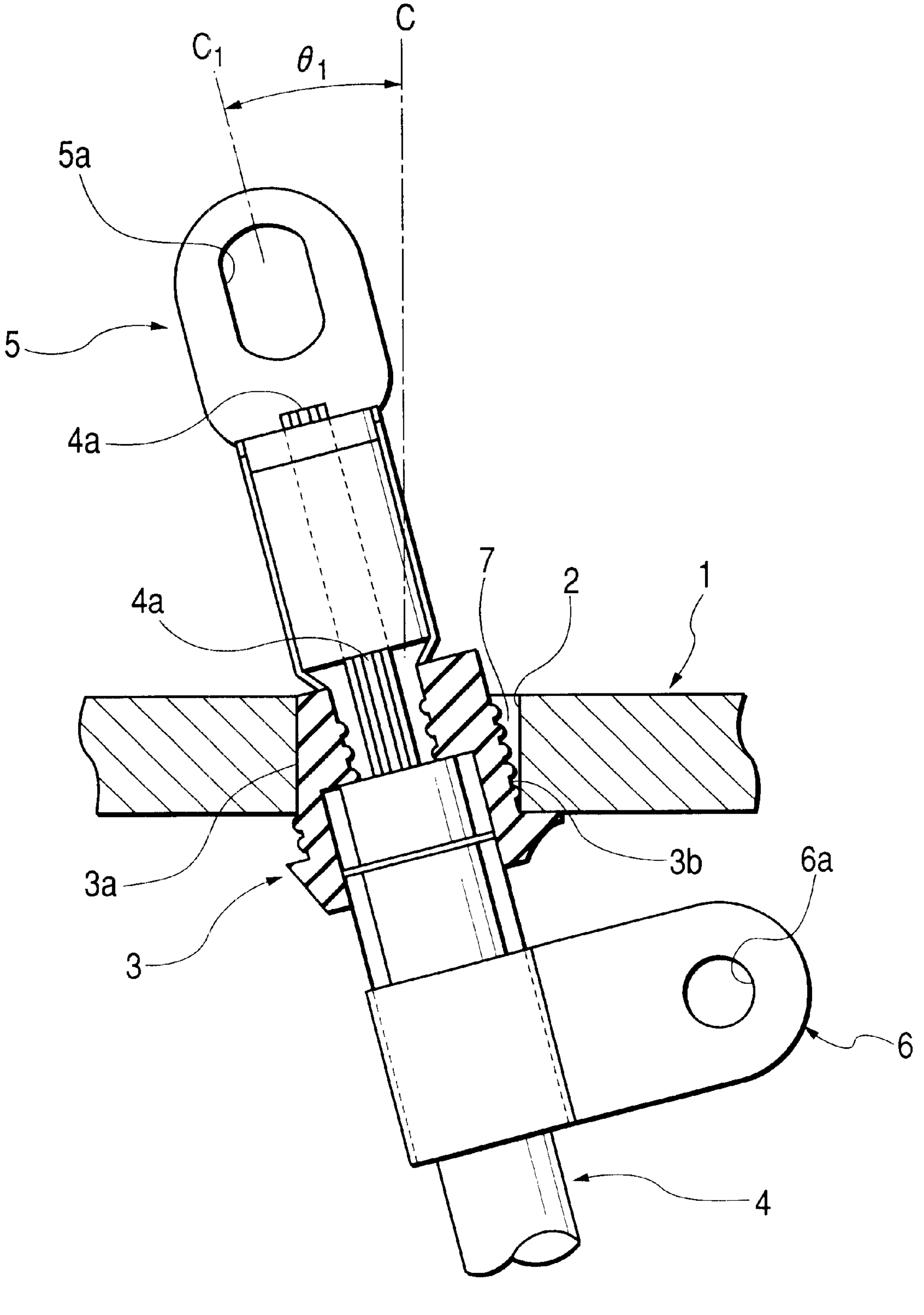
FIG. 4 is a partial section view of a related waterproof structure.

Thus, the grommet 12 serves as a seal member for the through hole 11 and as a protector for the terminal portion of the electric wire 20. Furthermore, it also serves as a noise insulator for preventing a noise from being generated by a high voltage if attachment to a motor case of an electric vehicle is assumed, for example. As shown in FIG. 3, moreover, the molding is carried out like bellows having a concavo-convex portion 16 provided alternately over the whole length of the grommet 12 so that proper flexibility and softness can be obtained. The clamper 24 of the LA terminal 23 is fitted and held in a leading end portion 14 of the grommet 12 and the clamper 27 of the flag terminal 26 is fitted and held in a rear end portion 15.

A tubular reinforcing spacer 30 is provided so as to externally cover the outer peripheral portion of the cylindrical grommet 12 in a part of a longitudinal direction through proper means such as fitting, bonding, caulking or fusion. Plastic or metal having greater hardness and rigidity than those of the material of the grommet 12 can be used for the material of the reinforcing spacer 30. A body 31 of the reinforcing spacer 30 is molded cylindrically to have such an inside diameter as to be fitted in the outer periphery of the grommet 12 and one of cylindrical ends is molded stepwise so as to have a greater outside diameter so that a flange portion 32 is provided.

As described the above, the terminal portion of the electric wire 20 is fixed to the LA terminal 23 in the housing 10 such as a motor case and the LA terminal 23 is fastened in the screw hole 25 with a bolt. The electric wire 20 in a portion which is not inserted in the through hole 11 is held by the flag fixture 26 on the outside of the housing 10 and the flag terminal 26 is fastened in the screw hole 28 with a bolt.

Figure 2:
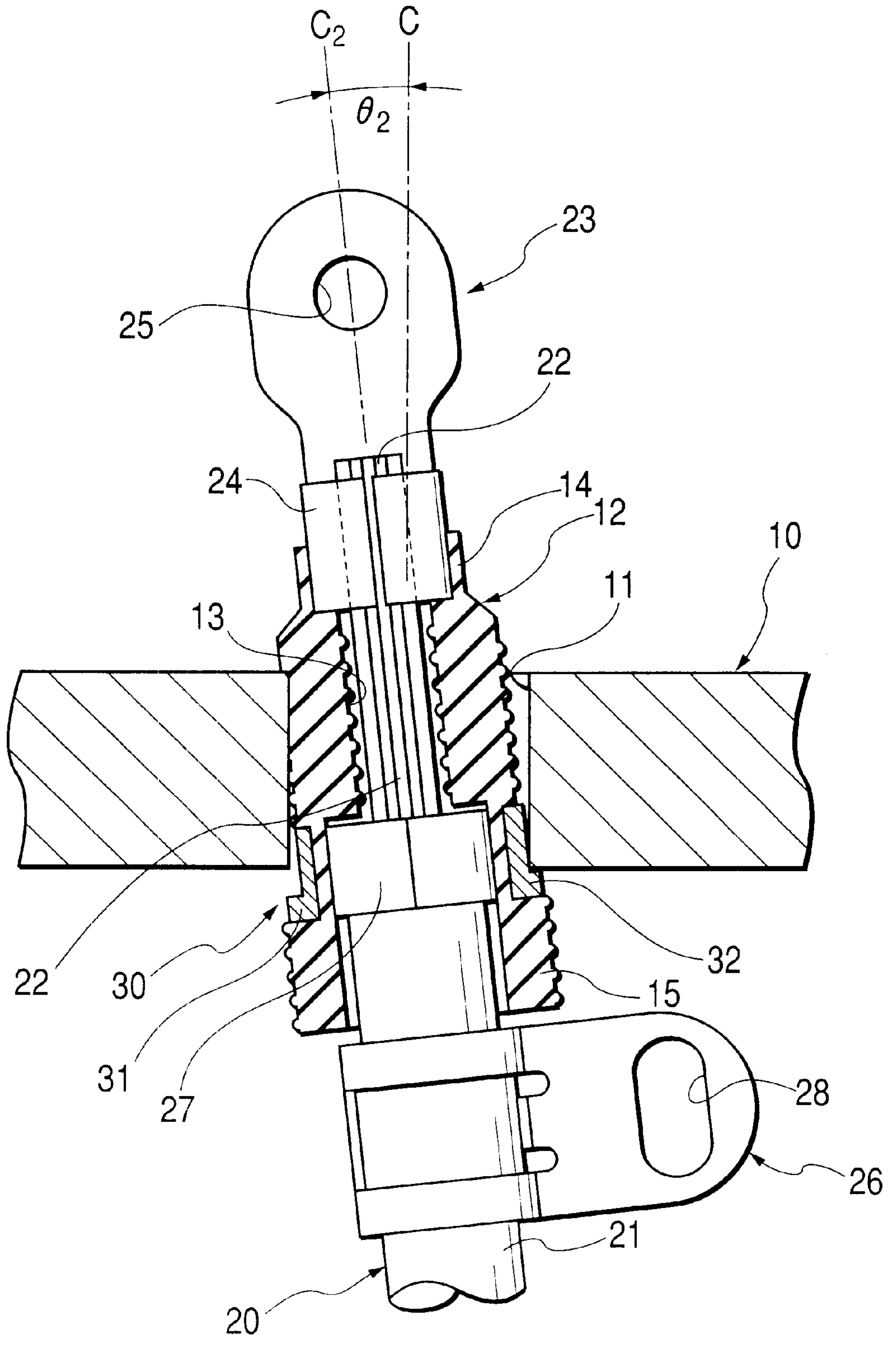
FIG. 2 is a partial section view of the waterproof structure showing a state that a grommet is slightly deformed elastically.

Here, as shown in FIG. 2, during the work for screwing the LA terminal 23 and the flag terminal 26 with a bolt, such tensile force as to bend the electric wire 20 is applied depending on the fastening discretion or technical skills of the worker using a fastening tool, particularly, in the case in which the flag terminal 26 is excessively fastened. The whole length of the terminal portion of the electric wire is pulled in such a direction as to be obliquely inclined by the tensile force so that an axis C of the LA terminal 23 which passes through the screw hole 25 tends to be obliquely inclined by an angle $\theta_2$.

The tensile force is also applied to the grommet 12 in the through hole 11 and the grommet 12 is distorted and deformed elastically by an offset load or rotating force around the axis C. If the grommet 12 is deformed elastically by the excessive fastening force of the flag terminal 26 on the outside of the housing 10, a portion having the largest amount of deformation is placed in a position in which it abuts against an edge on the inlet (outer) side and an edge on the outlet (inner) side of the through hole 11. In the embodiment, the reinforcing spacer 30 is provided on the grommet 12 in the portion to abut against at least the edge on the inlet side. Therefore, the reinforcing spacer 30 receives the offset load so that the elastic deformation of the grommet 12 can be minimized.

As a result, the grommet 12 can maintain close contact with the through hole 11 to ensure predetermined watertightness without forming a clearance together with the through hole 11, thereby preventing rain water or car-washing water from entering.

While one reinforcing spacer 30 according to the embodiment is provided as an individual product in the vicinity of the rear end of the grommet 12, that is, in a place corresponding to the edge on the inlet side of the through hole 11, it is also possible to provide another reinforcing spacer 30 in a place corresponding to the edge on the outlet side of the through hole 11 in the housing 10.

In place of the reinforcing spacer 30 to be the individual product according to the embodiment, moreover, it is also possible to integrally mold a reinforcing space “portion” on an outer peripheral portion in a place where the grommet 12 is required through two-color extrusion molding with the grommet body by a material having a greater mechanical property such as a hardness or a rigidity than that of the material of the grommet body.

Moreover, while there has been described such a structure that the LA terminal 23 is used as an example of the first terminal fitting and the flag terminal 26 is used as an example of the second terminal fitting, the use of both terminals is not restricted to the above. Also in the case of terminal fittings other than the LA terminal 23 and the flag terminal 26, the reinforcing spacer 30 according to the embodiment can be applied when the grommet 12 is distorted and deformed elastically by a tension due to excessive fastening.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A waterproof structure, comprising:

a housing body, formed with a through hole;

an electric wire, inserted through the through hole;

a first terminal fitting, provided with a first clamper which clamps a portion of the electric wire situated inside of the housing body to electrically connect therewith;

a second terminal fitting, provided with a second clamper which clamps a portion of the electric wire situated outside of the housing body;

a grommet, made of an elastic material and having a cylindrical shape such that the electric wire is passed through an inner periphery thereof and an outer periphery thereof is fitted into the through hole of the housing body; and a reinforcing spacer, provided on a part of the outer periphery of the grommet so as to abut against at least one of a first edge of the through hole at an outer face of the housing body and a second edge of the through hole at an inner face of the housing body, the reinforcing spacer made of a material having greater hardness than the elastic material forming the grommet.

2. The waterproof structure as set forth in claim 1, wherein the reinforcing spacer abuts against at least the first edge.

3. The waterproof structure as set forth in claim 1, wherein the reinforcing spacer is integrally molded with the grommet.

4. The waterproof structure as set forth in claim 1, wherein:

the reinforcing spacer includes a first part having a first diameter which is substantially identical with a diameter of the through hole of the housing body and a second part having a second diameter which is larger than the first diameter; and the first part is fitted into the through hole and the second part abuts against either the inner face or the outer face of the housing body.

5. The waterproof structure as set forth in claim 1, wherein the grommet extends so as to cover both of a part of the first clamper and a part of the second clamper.

* * * * *